US009614880B1

(12) United States Patent
Davis et al.

(10) Patent No.: US 9,614,880 B1
(45) Date of Patent: Apr. 4, 2017

(54) METHODS FOR REAL-TIME NOTIFICATIONS IN AN ACTIVITY STREAM

(71) Applicant: Google Inc., Mountain View, CA (US)

(72) Inventors: William Buckner Davis, Boulder, CO (US); George York, Lyons, CO (US); Donald Dylan Douglas, Longmont, CO (US); Michael Jeffrey Procopio, Boulder, CO (US); Eric Benson Schoeffler, Boulder, CO (US)

(73) Assignee: GOOGLE INC., Mountain View, CA (US)

( * ) Notice: Subject to any disclaimer, the term of this patent is extended or adjusted under 35 U.S.C. 154(b) by 286 days.

(21) Appl. No.: 14/077,662

(22) Filed: Nov. 12, 2013

(51) Int. Cl.
*H04L 29/06* (2006.01)
*G06F 17/30* (2006.01)
*G06F 15/16* (2006.01)
*G06F 17/00* (2006.01)

(52) U.S. Cl.
CPC ...... *H04L 65/403* (2013.01); *G06F 17/30165* (2013.01)

(58) Field of Classification Search
CPC ...... H04L 65/403; G06Q 10/00; G06Q 10/10; G06F 17/30165
USPC ............... 709/202–205, 224–225; 715/753; 707/687
See application file for complete search history.

(56) References Cited

U.S. PATENT DOCUMENTS

| 5,450,593 | A | 9/1995 | Howell et al. |
| 5,579,471 | A | 11/1996 | Barber et al. |
| 6,006,239 | A | 12/1999 | Bhansali et al. |
| 6,009,405 | A | 12/1999 | Leymann et al. |
| 6,119,165 | A | 9/2000 | Li et al. |
| 6,314,105 | B1 | 11/2001 | Luong |
| 6,449,688 | B1 | 9/2002 | Peters et al. |

(Continued)

FOREIGN PATENT DOCUMENTS

| EP | 0371608 | 6/1990 |
| EP | 1275222 | 1/2003 |

(Continued)

OTHER PUBLICATIONS

ISR & Written Opinion, Re: Application # PCT/US2015/020375; Jun. 12, 2015.

(Continued)

*Primary Examiner* — Emmanuel L Moise
*Assistant Examiner* — Zi Ye
(74) *Attorney, Agent, or Firm* — Young Basile Hanlon & MacFarlane, P.C.

(57) ABSTRACT

A method includes providing, by a server computer, a shared workspace for facilitating collaborative work by a plurality of users with respect to a plurality of shared-access objects; obtaining real-time activity information describing ongoing actions currently being performed with respect to one or more of the shared-access objects; determining, based at least in part on the real-time activity information, whether a real-time notification rule is satisfied; outputting, for display in an activity stream and in response to determining that the real-time notification rule is satisfied, a real-time notification; and removing, from display in the activity stream, the real-time notification upon determining that the real-time notification rule is no longer satisfied.

19 Claims, 6 Drawing Sheets

(56) References Cited

U.S. PATENT DOCUMENTS

| | | | |
|---|---|---|---|
| 6,507,845 B1* | 1/2003 | Cohen | G06Q 10/10 707/608 |
| 6,590,568 B1 | 7/2003 | Astala et al. | |
| 6,614,804 B1 | 9/2003 | McFadden et al. | |
| 6,687,735 B1 | 2/2004 | Logston et al. | |
| 6,711,557 B1 | 3/2004 | Palaniappan | |
| 6,947,396 B1 | 9/2005 | Salmi | |
| 7,030,861 B1 | 4/2006 | Westerman et al. | |
| 7,113,917 B2 | 9/2006 | Jacobi et al. | |
| 7,146,377 B2 | 12/2006 | Nowicki et al. | |
| 7,386,576 B2 | 6/2008 | Watanabe et al. | |
| 7,536,386 B2 | 5/2009 | Samji et al. | |
| 7,620,902 B2 | 11/2009 | Manion et al. | |
| 7,660,902 B2 | 2/2010 | Graham et al. | |
| 7,711,771 B2 | 5/2010 | Kirnos | |
| 7,756,821 B2 | 7/2010 | Havens et al. | |
| 7,821,405 B2 | 10/2010 | Heidloff et al. | |
| 7,827,299 B2 | 11/2010 | Cadarette et al. | |
| 7,904,303 B2 | 3/2011 | Chien et al. | |
| 7,908,183 B2 | 3/2011 | Jacobi et al. | |
| 7,945,600 B1 | 5/2011 | Thomas et al. | |
| 8,041,672 B2 | 10/2011 | Ogawa et al. | |
| 8,132,111 B2 | 3/2012 | Baron et al. | |
| 8,156,059 B2 | 4/2012 | Dunning et al. | |
| 8,194,986 B2 | 6/2012 | Conwell | |
| 8,196,047 B2 | 6/2012 | Fisher et al. | |
| 8,285,700 B2 | 10/2012 | Steelberg et al. | |
| 8,298,087 B1 | 10/2012 | Smith | |
| 8,407,613 B2 | 3/2013 | Hope | |
| 8,412,731 B2 | 4/2013 | Aubert et al. | |
| 8,417,000 B1 | 4/2013 | Mendis | |
| 8,429,565 B2 | 4/2013 | Agarawala et al. | |
| 8,458,174 B1 | 6/2013 | Duerig | |
| 8,464,184 B1 | 6/2013 | Cook et al. | |
| 8,467,955 B2 | 6/2013 | Jiang et al. | |
| 8,468,164 B1 | 6/2013 | Paleja et al. | |
| 8,479,122 B2 | 7/2013 | Hotelling et al. | |
| 8,504,565 B2 | 8/2013 | Pitts | |
| 8,522,230 B2 | 8/2013 | Nathan et al. | |
| 8,522,258 B1 | 8/2013 | Shaw | |
| 8,532,400 B1 | 9/2013 | Babenko et al. | |
| 8,547,352 B2 | 10/2013 | Park et al. | |
| 8,548,844 B2 | 10/2013 | Steelberg et al. | |
| 8,555,173 B2 | 10/2013 | Kast | |
| 8,560,975 B2 | 10/2013 | Beaver et al. | |
| 8,571,331 B2 | 10/2013 | Cifarelli | |
| 8,584,022 B1 | 11/2013 | O'Shaughnessy et al. | |
| 8,612,439 B2 | 12/2013 | Prahlad et al. | |
| 8,612,470 B1 | 12/2013 | Fushman et al. | |
| 8,624,836 B1 | 1/2014 | Miller et al. | |
| 8,638,312 B2 | 1/2014 | Lim | |
| 8,644,688 B2 | 2/2014 | Fishman et al. | |
| 8,661,053 B2 | 2/2014 | Flynn et al. | |
| 8,670,597 B2 | 3/2014 | Petrou et al. | |
| 2002/0054117 A1* | 5/2002 | van Dantzich | G06F 3/0482 715/766 |
| 2002/0099844 A1 | 7/2002 | Baumann et al. | |
| 2002/0112116 A1 | 8/2002 | Nelson | |
| 2002/0116399 A1 | 8/2002 | Camps et al. | |
| 2002/0167538 A1 | 11/2002 | Bhetanabhotla | |
| 2002/0178271 A1 | 11/2002 | Graham et al. | |
| 2002/0184375 A1 | 12/2002 | Wagner et al. | |
| 2003/0184653 A1 | 10/2003 | Ohkubo | |
| 2003/0208490 A1 | 11/2003 | Larrea et al. | |
| 2004/0135904 A1 | 7/2004 | Shiota et al. | |
| 2004/0189707 A1 | 9/2004 | Moore et al. | |
| 2005/0033777 A1 | 2/2005 | Moraes et al. | |
| 2005/0131992 A1 | 6/2005 | Goldstein et al. | |
| 2006/0059174 A1 | 3/2006 | Mese et al. | |
| 2006/0159127 A1 | 7/2006 | Childress et al. | |
| 2006/0229932 A1 | 10/2006 | Zollo et al. | |
| 2006/0242581 A1 | 10/2006 | Manion et al. | |
| 2007/0100937 A1* | 5/2007 | Burtner | G06Q 10/10 709/204 |
| 2007/0244969 A1* | 10/2007 | Knight | G06Q 10/10 709/204 |
| 2007/0250401 A1 | 10/2007 | Hearn et al. | |
| 2008/0123904 A1 | 5/2008 | Sakamoto et al. | |
| 2008/0126476 A1 | 5/2008 | Nicholas et al. | |
| 2008/0165141 A1 | 7/2008 | Christie | |
| 2008/0177623 A1 | 7/2008 | Fritsch et al. | |
| 2008/0195956 A1 | 8/2008 | Baron et al. | |
| 2008/0270398 A1 | 10/2008 | Landau et al. | |
| 2009/0112868 A1 | 4/2009 | Rajamani et al. | |
| 2009/0112985 A1* | 4/2009 | Quinn | G06Q 10/00 709/204 |
| 2009/0271356 A1 | 10/2009 | Jeong et al. | |
| 2009/0327975 A1 | 12/2009 | Stedman | |
| 2010/0017426 A1 | 1/2010 | Marston | |
| 2010/0046392 A1 | 2/2010 | Childress et al. | |
| 2010/0070707 A1 | 3/2010 | Nishimura | |
| 2010/0161441 A1 | 6/2010 | Hounsell | |
| 2010/0211575 A1 | 8/2010 | Collins et al. | |
| 2010/0241971 A1 | 9/2010 | Zuber | |
| 2010/0250337 A1 | 9/2010 | Kassaei | |
| 2010/0251305 A1 | 9/2010 | Kimble et al. | |
| 2010/0256981 A1 | 10/2010 | Nielsen et al. | |
| 2010/0332846 A1 | 12/2010 | Bowden et al. | |
| 2010/0332958 A1 | 12/2010 | Weinberger et al. | |
| 2011/0010672 A1 | 1/2011 | Hope | |
| 2011/0044512 A1 | 2/2011 | Bambha et al. | |
| 2011/0208668 A1 | 8/2011 | Phillips | |
| 2011/0289423 A1 | 11/2011 | Kim et al. | |
| 2012/0032436 A1 | 2/2012 | Zantout et al. | |
| 2012/0072449 A1 | 3/2012 | Patch et al. | |
| 2012/0078845 A1 | 3/2012 | Kasbekar et al. | |
| 2012/0084689 A1 | 4/2012 | Ledet et al. | |
| 2012/0089610 A1 | 4/2012 | Agrawal et al. | |
| 2012/0096046 A1 | 4/2012 | Kucera | |
| 2012/0136936 A1 | 5/2012 | Quintuna | |
| 2012/0192086 A1* | 7/2012 | Ghods | G06Q 10/10 715/753 |
| 2012/0197980 A1 | 8/2012 | Terleski et al. | |
| 2012/0213404 A1 | 8/2012 | Steiner | |
| 2012/0233227 A1 | 9/2012 | Alexander et al. | |
| 2012/0246153 A1 | 9/2012 | Pehle | |
| 2012/0254332 A1 | 10/2012 | Irvin | |
| 2012/0290609 A1 | 11/2012 | Britt | |
| 2012/0290926 A1 | 11/2012 | Kapadia et al. | |
| 2012/0290947 A1 | 11/2012 | Baggett et al. | |
| 2012/0303477 A1 | 11/2012 | Ben-Itzhak | |
| 2012/0303684 A1 | 11/2012 | Sakurai et al. | |
| 2012/0324368 A1 | 12/2012 | Putz et al. | |
| 2013/0014023 A1 | 1/2013 | Lee et al. | |
| 2013/0024464 A1 | 1/2013 | Berner et al. | |
| 2013/0073976 A1 | 3/2013 | McDonald et al. | |
| 2013/0080940 A1 | 3/2013 | Reeves et al. | |
| 2013/0104080 A1 | 4/2013 | Bosworth et al. | |
| 2013/0132896 A1 | 5/2013 | Lee et al. | |
| 2013/0138674 A1 | 5/2013 | Jeong et al. | |
| 2013/0138685 A1 | 5/2013 | Brucher et al. | |
| 2013/0173637 A1 | 7/2013 | Kim et al. | |
| 2013/0185638 A1 | 7/2013 | Tischer | |
| 2013/0188886 A1 | 7/2013 | Petrou et al. | |
| 2013/0202198 A1 | 8/2013 | Adam et al. | |
| 2013/0218845 A1* | 8/2013 | Kleppner | G06F 17/30165 707/687 |
| 2013/0263289 A1 | 10/2013 | Vijayan et al. | |
| 2013/0339435 A1 | 12/2013 | De Armas | |
| 2014/0019317 A1 | 1/2014 | Casares et al. | |
| 2014/0019910 A1 | 1/2014 | Kim et al. | |
| 2014/0029798 A1 | 1/2014 | Flynn et al. | |
| 2014/0067702 A1 | 3/2014 | Rathod | |
| 2014/0068443 A1 | 3/2014 | Eng et al. | |
| 2014/0129942 A1 | 5/2014 | Rathod | |
| 2014/0164535 A1 | 6/2014 | Lynch et al. | |
| 2014/0236722 A1 | 8/2014 | Rathus et al. | |
| 2014/0317552 A1 | 10/2014 | Romatoski | |
| 2015/0193521 A1 | 7/2015 | Schoeffler et al. | |

(56) References Cited

U.S. PATENT DOCUMENTS

2015/0363062 A1 12/2015 Gunn
2015/0363640 A1 12/2015 Meyer

FOREIGN PATENT DOCUMENTS

| | | |
|---|---|---|
| EP | 2187322 A1 | 5/2010 |
| EP | 2458512 | 5/2012 |
| WO | WO0051021 | 8/2000 |
| WO | WO03090096 | 10/2003 |
| WO | WO2007085083 | 8/2007 |
| WO | WO2009032712 | 3/2009 |
| WO | WO2012092025 | 7/2012 |

OTHER PUBLICATIONS

ISR and Written Opinion of the International Searching Authority for International Application No. PCT/US2015010618, Mar. 25, 2015.

ISR & Written Opinion, Re: Application #PCT/US2015/020378 citing new art; Aug. 18, 2015.

Automatic Album Maker Moment.me Arrives on Android, Adds A "Manual Mode" Mode to Boost Engagement, TechCrunch, Feb. 18, 2013, http://techcrunch.com/2013/02/18/automatic-album-maker-moment-me-arrives-on- android-adds-a-manual-mode-mode-to-boost-engagement/.

Flayvr, A. Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.

Larson, Michael, "Probing Network Characteristics: A Distributed Network Performance Framework", Dr. Dobb's Journal, Jun. 2004, pp. 22-29.

Lowe, D., "Object recognition from local scale-invariant features," International Conference on Computer Vision Corfu, Greece (Sep. 1999) pp. 1150-1157.

\* cited by examiner

METHODS FOR REAL-TIME NOTIFICATIONS IN AN ACTIVITY STREAM

BACKGROUND

The disclosure relates generally to methods for generating real-time notifications in an activity stream.

Computer systems are known that allow for shared access to objects. As one example, shared storage systems or workspaces allow users to create or store objects such as files at a remote server, access the files via a network such as the internet, grant shared access to the files to other users, and in some examples, edit the files using a file creation and editing system that is associated with the shared storage system. Shared access to an object can include the ability to download the object, view the object, modify the object, share the object with additional users, make copies of the object, and delete the object. These types of systems are referred to here as shared workspaces.

In one example of a shared workspace, online document storage and editing systems are known that store files and allow multiple users who have been granted access to a particular file to take actions such as editing files or adding comments to files. In some shared workspaces, users can be provided with historical activity information regarding completed actions that were previously performed with respect to certain shared-access objects.

SUMMARY

The disclosure relates to methods for generating real-time notifications in an activity stream.

One aspect of the disclosed embodiments is a method that includes providing, by a server computer, a shared workspace for facilitating collaborative work by a plurality of users with respect to a plurality of shared-access objects; obtaining real-time activity information describing ongoing actions currently being performed with respect to one or more of the shared-access objects; determining, based at least in part on the real-time activity information, whether a real-time notification rule is satisfied; outputting, for display in an activity stream and in response to determining that the real-time notification rule is satisfied, a real-time notification; and removing, from display in the activity stream, the real-time notification upon determining that the real-time notification rule is no longer satisfied.

Another aspect of the disclosed embodiments is a method that includes providing, by a server computer, a shared workspace for facilitating collaborative work by a plurality of users with respect to a plurality of shared-access objects; obtaining real-time activity information describing ongoing actions currently being performed with respect to the plurality of shared-access objects; applying a set of real-time notification rules to generate a set of real time notifications wherein each real-time notification rule is based at least in part on the real-time activity information and relates to one or more of the shared-access objects and wherein each real-time notification is associated with a ranking score; and outputting, for display in an activity stream, at least some of the real-time notifications based in part on the ranking score.

Another aspect of the disclosed embodiments is an apparatus that includes one or more processors and one or more memory devices for storing program instructions used by the one or more processors. The program instructions, when executed by the one or more processors, cause the one or more processors to provide a shared workspace for facilitating collaborative work by a plurality of users with respect to a plurality of shared-access objects; obtain real-time activity information describing ongoing actions currently being performed with respect to one or more of the shared-access objects; determine, based at least in part on the real-time activity information, whether a real-time notification rule is satisfied; output, for display in an activity stream and in response to determining that the real-time notification rule is satisfied, a real-time notification; and remove, from display in the activity stream, the real-time notification upon determining that the real-time notification rule is no longer satisfied.

BRIEF DESCRIPTION OF THE DRAWINGS

The description makes reference to the accompanying drawings wherein like reference numerals refer to like parts throughout the several views, and wherein.

DETAILED DESCRIPTION

Methods for generating real-time notifications in an activity stream are described here. A shared workspace facilitates collaborative work on a plurality of shared-access objects by a plurality of users. The systems and methods described here can obtain real-time activity information describing ongoing actions currently being performed with respect to one or more of the shared-access objects within the shared workspace. Based at least in part on this real-time activity information, the system and methods described here can determine whether any ongoing actions satisfy one or more real-time notification rules. If a real-time notification rule is satisfied, a real-time notification can be output for display in an activity stream. If the systems and methods described here further determine that the real-time notification rule is no longer satisfied, the real-time notification can be removed from display in the activity stream. Real-time notifications can be distinguished from historical notifications that can also be displayed within the activity stream by the status of the actions which generate them: currently ongoing actions for real-time notifications and previously completed actions for historical notifications.

Figure 1:
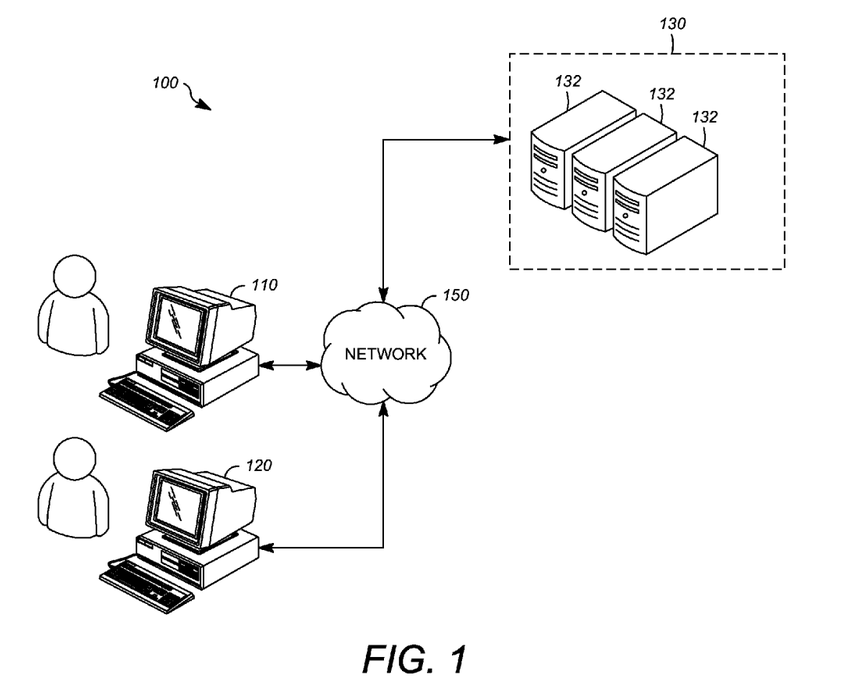
FIG. 1 is a block diagram showing an example of an environment in which a system for generating real-time notifications in an activity stream can be implemented.

FIG. 1 shows an example of an environment 100 in which a system for generating real-time notifications in an activity stream can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. As used here, a shared workspace is any manner of system, program, or interface that allows a defined group of users to utilize an access-restricted system in which information can be shared between users for the purpose of collaboratively working on a project. As will be discussed below, shared workspaces can implement document storage, creation, and editing functions. In some implementations, the application hosting service 130 allows a particular shared workspace to be accessed upon presentation of a credential, such as a user-name and password combination, that are associated with a registered user of that particular shared workspace. In some implementations, one or more users of each shared workspace are able to grant access to additional users or revoke access from existing users.

Figure 2:
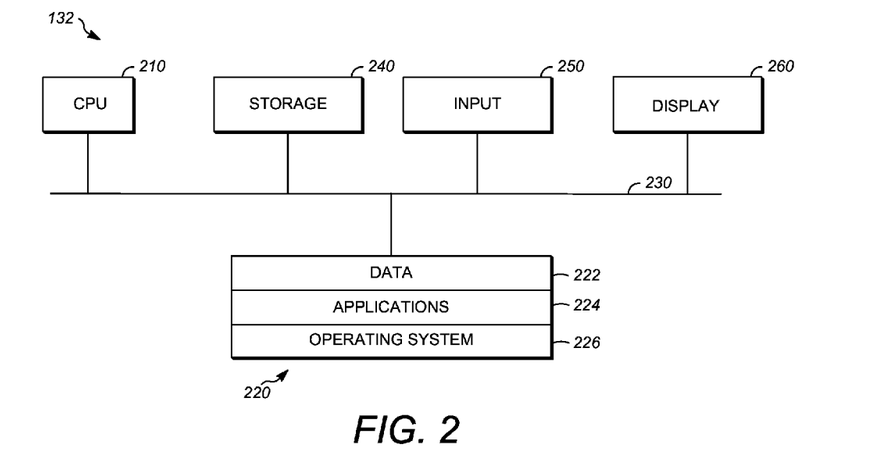
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
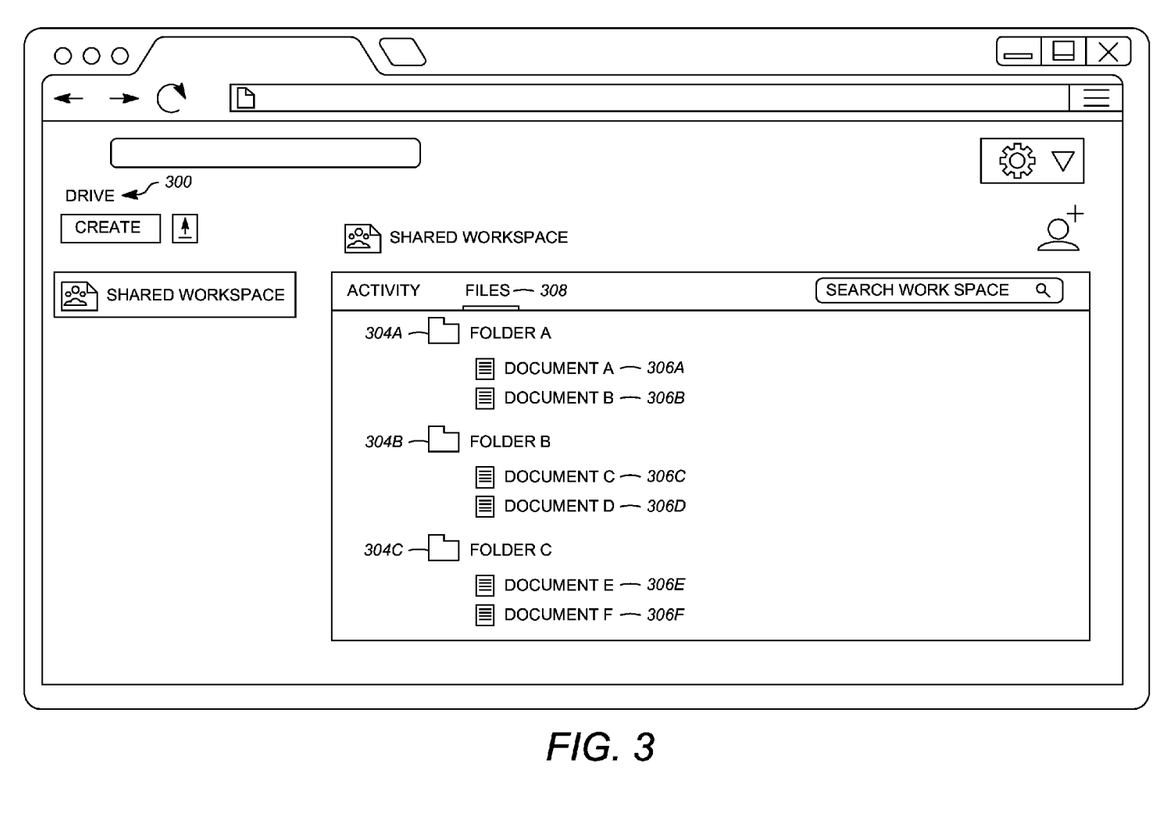
FIG. 3 shows an example interface for a shared workspace.

FIG. 3 shows an example interface 300 for a shared workspace. The interface 300 for the shared workspace can be a web based interface that can be output for display in the context of a web browser by way of a web page that is encoded in a mark-up language such as HTML that is transmitted from the application hosting service 130 to the user system 110 and output for display at the user system 110. Other types of interfaces are also possible.

In the illustrated example, the shared workspace includes a storage system, or drive, for storing shared-access objects. The storage system and any different or additional applications or systems that could be used in the shared workspace can be provided in the form of software instructions that are executed by a processor or computer, such as the one or more server computers 132 of the application hosting service 130 shown in FIG. 1. A plurality of shared-access objects in the form of folders 304*a-c* and documents 306*a-f* available within the folders 304*a-c* can be stored within the storage system and displayed within the interface 300 to the shared workspace, for example, using a tab-style access window denoted by the tag 308, "Files." Various actions can be taken by the users having access to the shared workspace in respect to the folders 304*a-c* and documents 306*a-f*. These actions can include opening, viewing, editing, commenting, sharing, downloading, sorting, renaming, closing, or any other type of actions related the folders 304*a-c* or documents 306*a-f* available in the storage system of the shared workspace.

Figure 4:
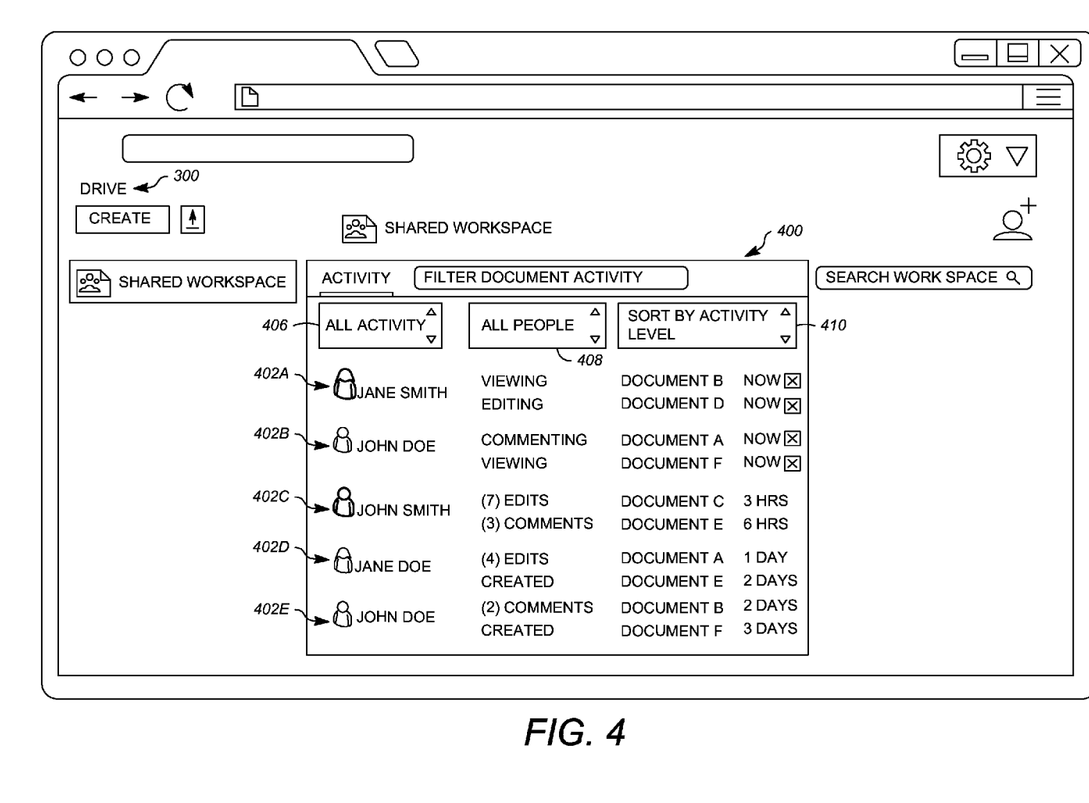
FIG. 4 shows the example interface for the shared workspace of FIG. 3 and an example interface for an activity stream.

FIG. 4 shows the example interface 300 for the shared workspace of FIG. 3 and an example interface 400 for an activity stream. The interface 400 for the activity stream can also be a web based interface that can be output for display in the context of a web browser by way of a web page that is encoded in a mark-up language such as HTML that is transmitted from the application hosting service 130 to the user system 110 and output for display at the user system 110. Other types of interfaces are also possible.

In the illustrated example, the shared workspace includes a notification system for generating, storing, and displaying notifications 402*a-e* within the activity stream, for example, within a tab-style access window denoted by the tag 404, "Activity." The notifications 402*a-e* can be used to provide insight to users of the shared workspace as to ongoing actions being taken and historical actions that have been taken by one or more users of the shared workspace with respect to the one or more folders 304*a-c* or one or more documents 306a-f that comprise the shared-access objects within the storage system. In this example, when the tab-style access window denoted by the tag 404, "Activity," is selected by a user of the shared workspace, the interface 400 for the activity stream is displayed over the location of the tag 308, "Files," as shown in FIG. 3. The interface 400 for the activity stream can be displayed within the interface 300 for the shared workspace as shown in FIG. 4, in proximity to the interface 300 for the shared workspace, as overlapping or covering the interface 300 for the shared workspace, or before displaying the interface 300 for the shared workspace to the user.

The notification system within the shared workspace can be configured to collect real-time activity information describing ongoing actions currently being performed with respect to one or more of the shared-access objects. This real-time activity information can include information describing, for example, the identification of a shared-access object, the type of ongoing action being taken with respect to a shared-access object, the identity of a user associated with an ongoing action in respect to a shared-access object, and information related to the time at which the ongoing action in respect to a shared-access object commenced. Similarly, historical activity information describing completed actions that were previously performed with respect to one or more of the shared-access objects can be collected and stored by the notification system, the storage system, or any other system associated with the shared workspace.

The notification system can also be configured to determine the content of real-time notifications based on whether a set of real-time notification rules is satisfied using real-time activity information. In one example, the notification system can be configured to display a real-time notification within the activity stream whenever a user is currently viewing, editing, or commenting upon the one of the folders 304a-c or one of the documents 306a-f within the shared workspace. As shown in FIG. 4, notification 402a includes two real-time notifications: one that user "Jane Smith" is currently viewing Document B 306b and another that "Jane Smith" is currently editing Document D 306d. Similarly, notification 402b includes two real-time notifications: one that user "John Doe" is currently commenting upon Document A 306a and another that "John Doe" is currently viewing Document F 306f. These are only example real-time notification rules, other real-time notification rules based on additional actions can be configured to provide users with the status of ongoing activities occurring within the shared workspace.

The notification system can also be configured to remove real-time notifications from display within the activity stream upon determining that the real-time notification rule which generated the real-time notification is no longer being satisfied. For example, once "Jane Smith" closes Document B 306b in the shared workspace, the notification system can remove this information from display within notification 402a. Similarly, once "John Doe" closes out the commenting function for Document A 306a, the notification system can remove this information from display within notification 402b.

The notification system can also be configured to determine the content of historical notifications based on whether a set of historical notification rules is satisfied using historical activity information. In one example, the notification system can be configured to display a historical notification within the activity stream based on previously completed user actions in the shared workspace, such as creation of documents 306a-f, comments made within documents 306a-f, edits made within documents 306a-f, etc. As shown in FIG. 4, notification 402e includes two historical notifications: one that user "John Doe" created two comments for Document B 306b 2 days ago and another that "John Doe" created Document F 306f 3 days ago. Similarly, notification 402c includes two historical notifications: one that user "John Smith" made seven edits to Document C 306c three hours ago and another that "John Smith" added three comments to Document E 306e six hours ago. Notification 402d related to "Jane Doe" also includes two historical notifications.

Though the interface 400 to the activity stream in FIG. 4 is configured to separate the real-time notifications, e.g. notifications 402a-b, from the historical notifications, e.g. notifications 402c-e as shown with a bar displayed between the two types of notifications, there are a variety of filtering and sorting options that can be applied by the notification system or the user when displaying the notifications 402a-e within the activity stream to best serve the needs of a given user in understanding both the ongoing and historical actions within the shared workspace. For example, various selection or drop-down menus or buttons, such as the activity menu 406, the user menu 408, and the sort-by menu 410, can be used to allow the user to filter and sort the notifications 402a-e within the activity stream. Ranking scores can also be associated with the notifications 402a-e to assist in filtering and sorting within the activity stream.

In one example, the user menu 408 and the sort-by menu 410 can be used to filter the notifications 402a-e based on the level of activity of the user and the identity of the user taking the actions that satisfy one of the notification rules (e.g. the real-time notification rules or the historical notification rules) in the notification system. The identities of the users can be represented both by names, for example "Jane Smith," "John Doe," "Jane Doe," and "John Smith," and by pictures or icons associated with the users. The order in which the users are listed within the activity stream can be based on the level of activity of the user, for example, based on the number of actions taken by the user or based on how recently the actions occurred.

The order in which the users are listed within the activity stream can also be based on a ranking score associated with the user. The ranking score can be based, for example, on the identity of the user performing an action, the permission levels (e.g. owner, editor, commenter, viewer) associated with the user performing the action, the level of activity of the user performing an action, the identification of the shared-access object undergoing an action, the subject matter of the shared-access object undergoing the action, or the preferences of the user viewing the activity stream. In the example of FIG. 4, "Jane Smith" is shown as the most active current user or user with the highest ranking score in the activity stream and "John Doe" is shown as both the least active or lowest ranked current user and the least active or lowest ranked historical user in the activity stream. The use of a ranking score is just one example of how the notifications 402a-e can be ordered within the activity stream.

The icons for the most active or highest ranked users, e.g. current user "Jane Smith" and historical user "John Smith," can be configured to appear darker than the icons for the less active or lower ranked users, in this example, current and historical user "John Doe." Hence, opacity of a user icon is another means of sorting or filtering the notifications 402a-e based on the ranking score, activity level, and identity of the users within the activity stream. In the example shown in FIG. 4, both the real-time notifications 402a-b and historical notifications 402c-e are grouped by the identity of the user taking the action within the shared workspace. The notifications 402a-e displayed within the interface 400 to the activity stream can also be restricted to some subset of the total available notifications based on the ranking scores. For example, a user can select or the notification system can be configured to display only the highest ranked users performing ongoing or historical actions, e.g. those actions that occurred most recently or that were performed by a selected group of highly-ranked users. Both the user menu 408 and the sort-by menu 410 can be used to implement the desired subset of notifications to display within the activity stream.

Figure 5:
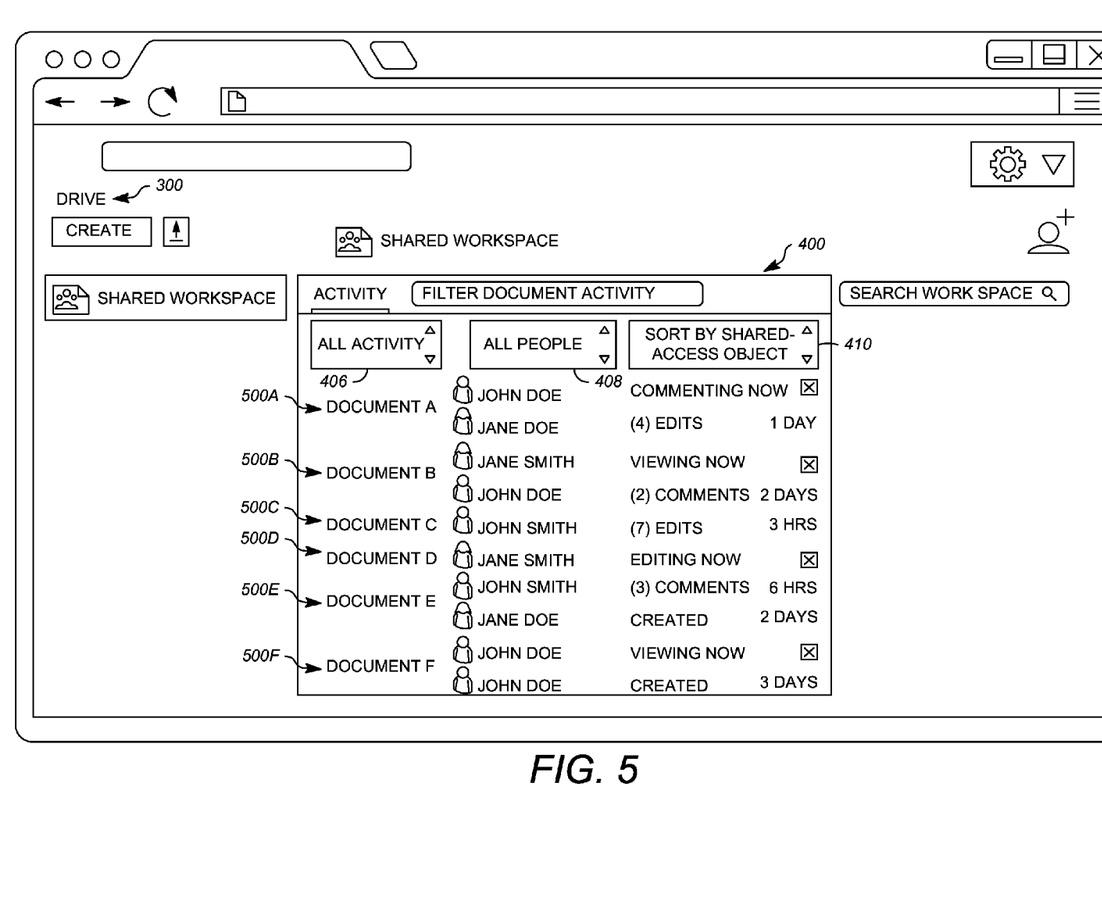
FIG. 5 shows the example interface for the shared workspace of FIG. 3 and the example interface for the activity stream of FIG. 4 using a different display configuration.

As described above, various sorting and filtering of the notifications 402a-e are possible, such as grouping by the ownership of the shared-access object upon which actions are being taken, by the status of a given user within the shared workspace (e.g. viewing, editing, idle, offline), by the subject matter of the shared-access objects upon which the actions are taken, by the type of action being taken that satisfies either a real-time notification rule or historical notification rule, and as described below in respect to FIG. 5, by the identification of the shared-access object upon which the actions are taken. Each means of grouping can be configured by the notification system or chosen by the user based on the selections within the activity menu 406, user menu 408, and sort-by menu 410.

The real-time notifications 402a-b can also be configured to be removed from display within the activity stream, for example, by the user dismissing one or more of the real-time notifications 402a-b from the activity stream by selecting, for example, a close icon represented by an "X" within a box, proximate to the respective real-time notification 402a, 402b. The real-time notifications 402a-b in the activity stream can also be distinguished from the historical notifications 402c-e within the activity stream as shown in FIG. 4 by including a divider bar between the real-time notifications 402a-b and the historical notifications 402c-e. Alternatively, the real-time notifications 402a-b and historical notifications 402c-e could be intermixed within the activity stream based on the various ranking, filtering, and sorting features previously described.

FIG. 5 shows the example interface 300 for the shared workspace of FIG. 3 and the example interface 400 for the activity stream of FIG. 4 using a different display configuration. The notification system is represented within the interface 400 for the activity stream by a listing of notifications 500a-f. Each of the notifications 500a-f can include information describing, for example, the identification of a shared-access object such as one of the documents 306a-f, the action ongoing (for real-time notifications) or previously taken (for historical notifications) with respect to one of the shared-access objects, the identities of one or more users associated with the actions such as "John Doe," "Jane Doe," "John Smith," and Jane Smith," information related to the time at which the action is occurring or has occurred, and information identifying the one or more systems that were involved in executing the action with respect to one of the shared-access objects. The activity stream in FIG. 5 relates to the same shared-access objects, documents 306a-f, same users, "John Doe," "Jane Doe," "John Smith," and Jane Smith," and same ongoing or historical actions as described with respect to the activity stream in FIG. 4, but is presented using a different sorting method as indicated using the sort-by menu 410 populated with the value "Shared-Access Object."

In the FIG. 5 example, the notifications 500a-f are sorted, or filtered, based on the identification of the shared access object upon which ongoing or historical actions were taken in the shared workspace. The types of actions that are ongoing or previously taken are also shown, and include commenting, viewing, editing, previous edits, previous comments, and previous creation, though other types of actions are also possible. The notifications 500a-f can also be displayed, sorted, or filtered based on associated ranking scores. In the FIG. 5 example, Document A 306a is listed at the top of the activity stream based on the identification of the shared access object and alphabetical sorting indication for the shared-access objects within the sort-by menu 410. The display configurations for the interface 400 to the activity stream shown in FIGS. 4 and 5 are just two examples of the ranking, sorting, and filtering features possible and type of information provided within the real-time notifications and historical notifications to the users of the shared workspace.

The notifications 500a-f can also include information about the duration of a user's interaction with a shared-access object, the current status of the user within the shared workspace (e.g. idle, brainstorming, refining, commenting, offline, seeking collaborators, etc.), the number of users currently collaborating on a shared-access object, or any other information related to the ongoing or previous actions being taken within the shared workspace. The shared workspace, storage system, activity stream, and notification system can also be configured for integration into a calendar application. For example, a meeting within the calendar application can be configured to be a shared workspace and invitees to the meeting can be the users of the shared workspace. The activity stream tracking the actions within the meeting can indicate to each of the invitees participating in the meeting which shared-access objects are being viewed, edited, opened, closed, etc. by other meeting participants. This application of the activity stream can be particularly useful in the meeting context when invitees are in separate geographic locations but still want to work together at the same time on the same shared-access objects, such as the documents 306a-e, stored within a document storage system.

Figure 6:
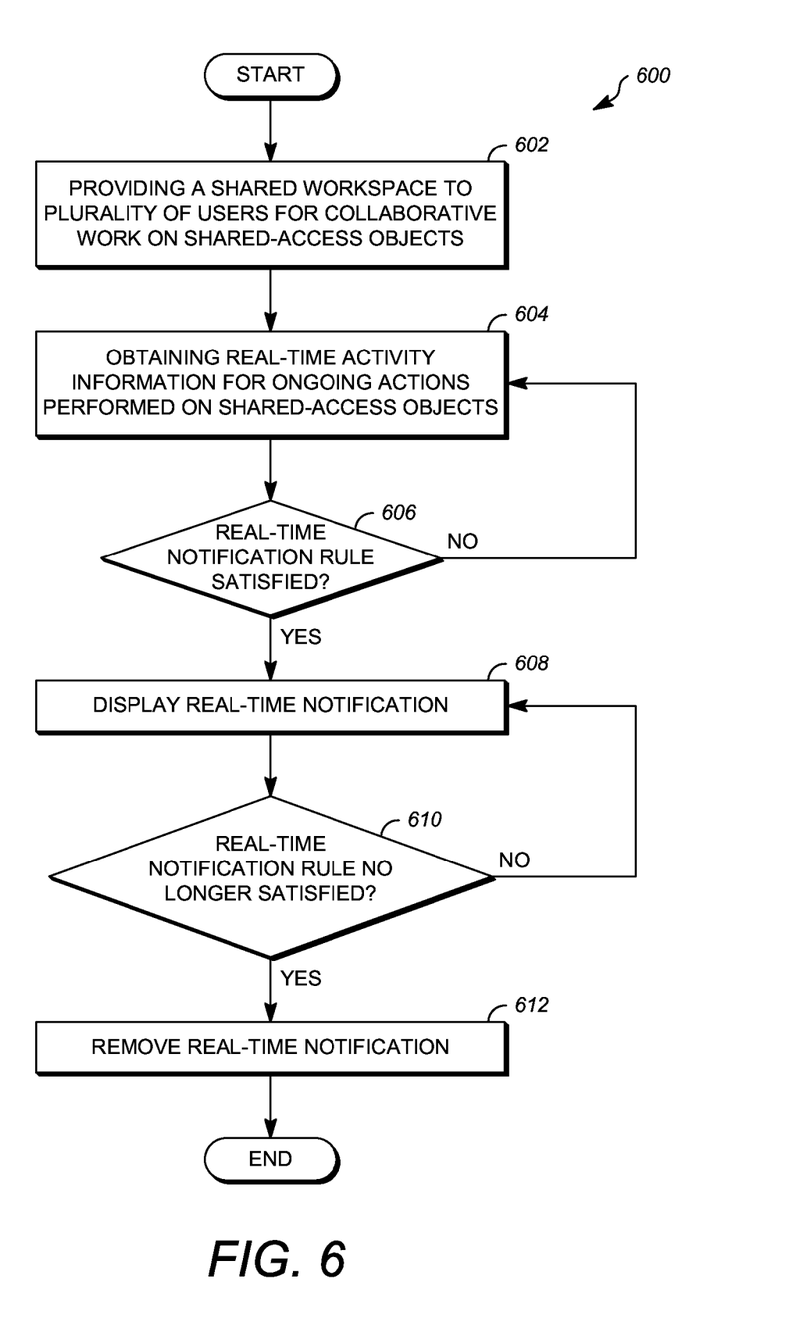
FIG. 6 is a flowchart showing an example of a process for generating real-time notifications in an activity stream.

FIG. 6 is a flowchart showing an example of a process 600 for generating real-time notifications, such as notifications 402a-b, in an activity stream. The operations described in connection with the process 600 can be performed at one or more computers, such as at the one or more server computers 132 of the application hosting service 130. When an operation is performed by one or more computers, it is completed when it is performed by one computer. The operations described in connection with the process 600 can be embodied as a non-transitory computer readable storage medium including program instructions executable by one or more processors that, when executed, cause the one or more processors to perform the operations. For example, the operations described in connection with the process 600 could be stored at the memory 220 of a respective one of the server computers 132 and be executable by the CPU 210 thereof.

At operation 602, a shared workspace is provided for facilitating collaborative work by a plurality of users on a plurality of shared-access objects. The shared workspace can be provided, for example, by one of the server computers 132 of FIG. 1 and can be displayed to one or more of the plurality of users in the form of an interface such as the interface 300 shown in FIGS. 3-5. The shared workspace can include a storage system represented within the interface 300 for the shared workspace by a listing of folders 304a-c and a listing of documents 306a-f available within the folders 304a-c of the storage system as shown in FIG. 3.

At operation 604, real-time activity information describing ongoing actions currently being performed with respect to one or more of the shared-access objects is obtained, for example, using the notification system. As described above, real-time activity information can include information describing the identification of a shared-access object, the type of ongoing action being taken with respect to a shared-access object, the identity of a user associated with an ongoing action in respect to a shared-access object, and information related to the time at which the ongoing action in respect to a shared-access object commenced.

At operation 606, a determination is made as to whether a real-time notification rule is satisfied based at least in part on the real-time activity information obtained in operation 604. One or more real-time notification rules can be configured, as described above in reference to FIGS. 4 and 5, to track or flag specific ongoing actions taken in respect to the shared-access objects within the shared workspace. These ongoing actions can include, for example, viewing, sharing, editing, downloading, and commenting. If the shared-access objects include folders 304a-c or documents 306a-e, determining whether any ongoing actions satisfy a real-time notification rule can include analyzing the folders 304a-c and documents 306a-e stored in the document storage system.

If, at operation 606, it is determined that no ongoing actions within the shared workspace satisfy a real-time notification rule, the process 600 returns to operation 604. If, at operation 606, it is determined that an ongoing action satisfies at least one real-time notification rule, the process 600 advances to operation 608. At operation 608, a real-time notification is generated and output for display in the activity stream. For example, the real-time notifications 402a-b displayed within the interface 400 to the activity stream shown in FIG. 4 were generated in response to various real-time notification rules being satisfied within the notification system. These real-time notifications 402a-b can be configured to include information related to the shared-access objects upon which the ongoing actions are being taken, the users who are currently taking the actions in respect to the shared-access objects, the type of actions that are being taken in respect to the shared-access objects, etc.

At operation 610, a determination is made as to whether one of the real-time notification rules is no longer being satisfied. If, at operation 610, it is determined that the real-time notification rule is still being satisfied, the process 600 returns to operation 608, and the real-time notification remains as displayed within the activity stream. If, at operation 610, it is determined that the real-time notification rule is no longer satisfied, the process 600 advances to operation 612, and the applicable notification can be removed from the activity stream. For example, the user "Jane Smith" who is currently viewing Document B 306b according to real-time notification 402a shown in FIG. 4 could close Document B 306b. In this example, the real-time notification rule based on the current viewing of a shared-access object would no longer be satisfied. The process 600 then ends.

Figure 7:
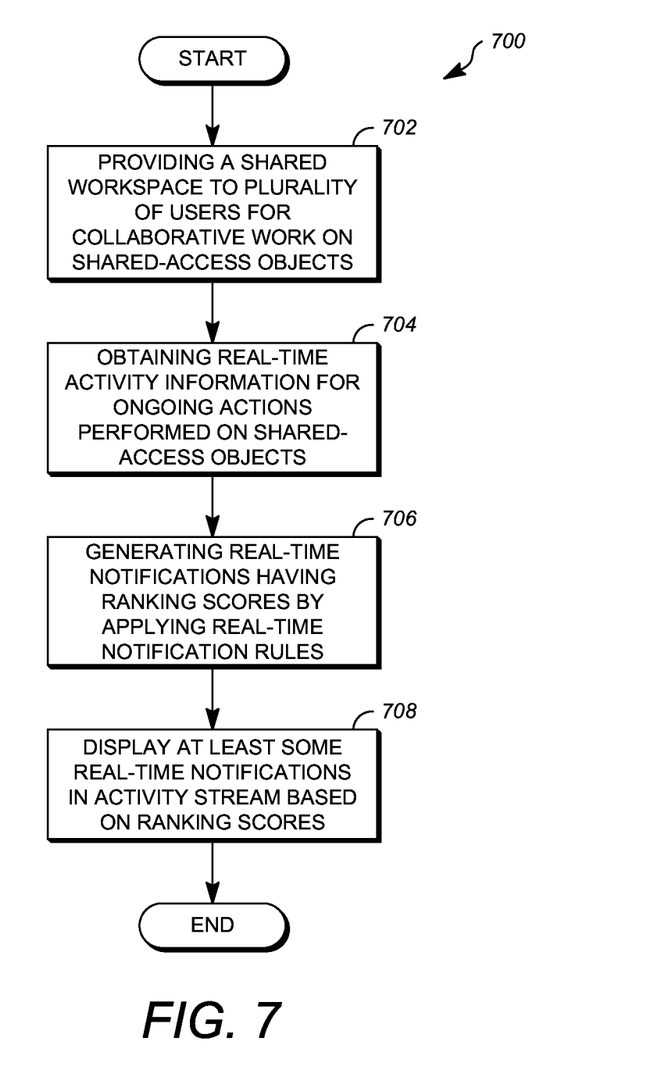
FIG. 7 is a flowchart showing another example of a process for generating real-time notifications in an activity stream.

FIG. 7 is a flowchart showing another example of a process 700 for generating real-time notifications, such as notifications 402a-b, in an activity stream. The operations described in connection with the process 700 can be performed at one or more computers, such as at the one or more server computers 132 of the application hosting service 130. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of a respective one of the server computers 132 and be executable by the CPU 210 thereof.

At operation 702, a shared workspace is provided for facilitating collaborative work by a plurality of users on a plurality of share-access objects. The shared workspace can be provided, for example, by one of the server computers 132 of FIG. 1 and can be displayed to one or more of the plurality of users in the form of an interface such as the interface 300 shown in FIGS. 3-5. The shared workspace can include a storage system represented within the interface 300 for the shared workspace by a listing of folders 304a-c and a listing of documents 306a-f available within the folders 304a-c of the storage system as shown in FIG. 3.

At operation 704, real-time activity information describing ongoing actions currently being performed with respect to one or more of the shared-access objects is obtained, for example, using the notification system. As described above, real-time activity information can include information describing the identification of a shared-access object, the type of ongoing action being taken with respect to a shared-access object, the identity of a user associated with an ongoing action in respect to a shared-access object, and information related to the time at which the ongoing action in respect to a shared-access object commenced.

At operation 706, a set of real-time notification rules can be applied to generate a set of real-time notifications, such as real-time notification 402a-b. The real-time notification rules can be based, at least in part, on the real-time activity information obtained at operation 704 and can be configured to relate to one or more of the shared-access objects within the shared workspace. The real-time notifications generated in response to satisfaction of one or more of the real-time notification rules can also be associated with a ranking score. As described above, the ranking score can be based, for example, on the identity of the user performing an action, the level of activity of the user performing an action, the identification of the shared-access object undergoing an action, the subject matter of the shared-access object undergoing the action, or the preferences of the user viewing the activity stream.

At operation 708, at least some of the real-time notifications generated at operation 706 can be output for display in the activity stream. The notification system can determine which subset of real-time notifications to display within the activity stream based in part on the ranking scores associated with each of the real-time notifications. For example, a user can select or the notification system can be configured to display real-time notifications for ongoing actions that are being performed by a selected group of highly-ranked users that are important to the user viewing the activity stream. After display of at least some of the real-time notifications, the process 700 ends.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements.

Also, the particular division of functionality between the various system components described here is merely exemplary, and not mandatory; functions performed by a single system component may instead be performed by multiple components, and functions performed by multiple components may instead performed by a single component.

The words "example" or "exemplary" are used here to mean serving as an example, instance, or illustration. Any aspect or design described here as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described here can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described here do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described here, such as client computers and server computers, can be implemented using general purpose computers/processors with a computer program that, when executed, carries out any of the respective methods, algorithms and/or instructions described here. In addition or alternatively, for example, special purpose computers/processors can be utilized which can contain specialized hardware for carrying out any of the methods, algorithms, or instructions described here.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations described. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described here. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method, comprising:
   providing, by a server computer, a shared workspace for facilitating collaborative work by a plurality of users with respect to a plurality of shared-access objects comprising shared-access documents and shared-access folders;
   obtaining, by the server computer, real-time activity information describing ongoing actions currently being performed with respect to one or more of the shared-access objects;
   determining, by the server computer based at least in part on the real-time activity information, whether a real-time notification rule is satisfied, wherein the real-time notification rule is a rule about ongoing actions currently being performed with respect to one or more of the shared-access objects of the shared workspace;

outputting, by the server computer for display in an activity stream and in response to determining that the real-time notification rule is satisfied, a real-time notification associated with the real-time notification rule, wherein the real-time notification comprises information identifying a system involved in performing an ongoing action and at least one of an identification of the shared-access object, an identification of the ongoing action being performed on the shared-access object, an identity of a user performing the ongoing action, a time at which the ongoing action commenced, a current status of the user performing the ongoing action, and a number of users currently collaborating on the shared-access object, and wherein the real-time notification is associated with a ranking score, the ranking score based in part on a permission level associated with the user currently performing the ongoing action associated with the real-time notification; and removing, by the server computer, from display in the activity stream, the real-time notification upon determining that the real-time notification rule is no longer satisfied.

2. The method of claim 1, further comprising:

storing historical activity information describing completed actions that were previously performed with respect to the one or more of the shared-access objects; and outputting, for display in the activity stream, at least one historical notification based on the historical activity information.

3. The method of claim 1, wherein the real-time notification can be located within the activity stream based on the identity of the user taking the ongoing action that satisfied the real-time notification rule.

4. The method of claim 1, wherein the real-time notification can be located within the activity stream based on a level of activity within the shared workspace of the user taking the ongoing action that satisfied the real-time notification rule.

5. The method of claim 4, wherein the real-time notification further comprises the identity of the user includes an icon and wherein an opacity of the icon is indicative of the level of activity of the user in the shared workspace.

6. The method of claim 1, wherein the real-time notification can be located within the activity stream based on a subject matter of the shared-access object upon which the ongoing action is being taken that satisfied the real-time notification rule.

7. The method of claim 1, further comprising:

removing, from display in the activity stream, the real-time notification based on receiving an indication to dismiss the real-time notification.

8. The method of claim 1, wherein the ongoing actions comprise open, view, edit, comment, share, download, sort, rename, and close with respect to objects in the shared workspace.

9. The method of claim 1, wherein the current status of the user performing the ongoing action is selected from a set of statuses including idle, brainstorming, refining, commenting, and seeking collaborators.

10. A method, comprising:

providing, by a server computer, a shared workspace for facilitating collaborative work by a plurality of users with respect to a plurality of shared-access objects;

obtaining, by the server computer, real-time activity information describing ongoing actions currently being performed with respect to the plurality of shared-access objects;

applying, by the server computer, a set of real-time notification rules to generate a set of real-time notifications, wherein each real-time notification rule is based at least in part on the real-time activity information and relates to one or more of the shared-access objects, wherein each real-time notification is associated with a ranking score, the ranking score based in part on a permission level associated with a user currently performing the real-time activity associated with the real-time notification, and wherein each real-time notification is associated with a real-time notification rule;

outputting, by the server computer for display in an activity stream, at least some of the real-time notifications based in part on the ranking scores, wherein each real-time notification comprises an identification of an ongoing action being performed on the shared-access object, information identifying a system involved in performing the ongoing action, and an identity of the user performing the ongoing action; and removing, by the server computer from display in the activity stream, at least one of the real-time notifications upon determining that at least one of the real-time notification rules is no longer satisfied.

11. The method of claim 10, wherein outputting at least some of the real-time notifications includes outputting a subset of the real-time notifications, wherein the subset of the real-time notifications is selected based on the ranking score for each of the real-time notifications.

12. The method of claim 10, further comprising:

storing historical activity information describing completed actions that were previously performed with respect to the plurality of the shared-access objects; and wherein outputting at least some of the real-time notifications includes outputting at least some of the real-time notifications for display within an activity stream that includes at least one historical notification based on the historical activity information.

13. The method of claim 10, wherein outputting at least some of the real-time notifications includes outputting at least some of the real-time notifications in a display order within the activity stream based on the ranking score for each of the real-time notifications.

14. The method of claim 10, wherein the ranking score is further based at least in part on the identity of the user currently performing at least one of the ongoing actions with respect to the plurality of shared-access objects, a level of activity of the user currently performing the at least one of the ongoing actions, and identification of the shared-access object undergoing at least one of the ongoing actions.

15. The method of claim 10, wherein the ranking score is based at least in part on a subject matter of the shared-access object undergoing at least one of the ongoing actions.

16. An apparatus, comprising:

one or more processors; and one or more memory devices for storing program instructions used by the one or more processors, wherein the program instructions, when executed by the one or more processors, cause the one or more processors to:

provide a shared workspace for facilitating collaborative work by a plurality of users with respect to a plurality of shared-access objects, the shared workspace being associated with a meeting in a calendar application, the meeting having invitees, and the plurality of users including the invitees;

obtain real-time activity information describing ongoing actions currently being performed with respect to one or more of the shared-access objects of the shared workspace;

determine, based at least in part on the real-time activity information, whether a real-time notification rule is satisfied;

output, for display in an activity stream and in response to determining that the real-time notification rule is satisfied, a real-time notification associated with the real-time notification rule, wherein the real-time notification about a shared-access object comprises an identification of the shared-access object, an identification of an ongoing action being performed on the shared-access object, an identity of a user performing the ongoing action, and an icon representing the identity of the user, wherein an opacity of the icon indicates a level of activity of the user in the shared workspace, and wherein the real-time notification is associated with a ranking score, the ranking score based in part on a permission level associated with the user currently performing the ongoing action; and remove, from display in the activity stream, the real-time notification upon determining that the real-time notification rule is no longer satisfied.

17. The apparatus of claim 16, wherein the one or more processors are further configured to:

store historical activity information describing completed actions that were previously performed with respect to the shared-access objects; and output, for display in the activity stream, at least one historical notification based on the historical activity information.

18. The apparatus of claim 16, wherein the one or more processors are further configured to:

remove, from display in the activity stream, the real-time notification based on receiving an indication to dismiss the real-time notification.

19. The apparatus of claim 16, wherein the real-time notification further comprises a current status of the user performing the ongoing action and a number of users currently collaborating on the shared-access object.

* * * * *